Patented Sept. 13, 1927.

1,642,078

UNITED STATES PATENT OFFICE.

JAMES McINTOSH AND EDWIN YEAKLE WOLFORD, OF NORRISTOWN, PENNSYLVANIA, ASSIGNORS TO DIAMOND STATE FIBRE COMPANY, OF ELSMERE, DELAWARE, A CORPORATION OF DELAWARE.

SYNTHETIC RESIN AND METHOD OF MAKING SAME.

No Drawing.   Application filed August 12, 1920. Serial No. 403,126.

Our invention relates to that class of condensation products utilizing phenol or one of its homologues, and one object of said invention is to provide a new condensation product of the above class which shall employ glycerine or glycerine derivatives in its formation.

It is also desired to provide a synthetic resin which shall be inexpensive and easy to make, whose nature shall be such as to fit it for use as a shellac substitute, as a molding compound, as a water-proofing agent for impregnating sheet, tube and rod material made of paper, woven or felted fabric, parchmentized fibre and for the many other uses requiring a hard relatively infusible, insoluble and structurally strong, light, tough substance.

Another object of the invention is to provide a synthetic resin of the above class which shall be available for use as a non-conductor of high dielectric value, which shall be water and oil proof and which may be prepared in soluble or insoluble form at will, being, when in soluble form, capable of further treatment whereby it may be changed at will into its insoluble and infusible form.

We also desire to provide a condensation product which in its initial stage or form may be utilized in connection with suitable powdered or fibrous material as a substance from which articles may be subsequently molded under heat and pressure in order to transform said product to its final solid and infusible form.

It is further desired to provide a relatively simple, inexpensive and easily operated process utilizing glycerine or glycerine derivatives for making products of the above class.

In carrying out our invention in a typical case, we prepare a mixture of one hundred grams of phenol or one of its homologues and ninety to one hundred grams of glycerine or one of the derivatives of glycerine such as epichlorhydrin, allyl alcohol, glycerine aldehyde, di-hydroxy-acetone, etc., with a suitable catalytic agent, such as about twenty drops of sulphuric acid in the case specified, or 40 drops of bromine.

The above mixture is then boiled from six to eight hours under a reflux condenser, at the end of which time the resulting liquid is transferred to an oven and subjected to a temperature of about 125 deg. C. for further condensation. If this heating in the oven be stopped at the end of four or five hours, the material constitutes an initial condensation product and is soluble in alcohol, acetone, benzol and other ordinary organic solvents such as those above noted and is fusible at elevated temperatures.

When subjected to further condensation by being heated to a temperature of about 125 deg. C. for a period of about twenty-four hours, the initial product will change to its solid form in which it is infusible at all temperatures and insoluble in the ordinary organic solvents such as those above noted.

In either its initial or final form the above described condensation product of the phenolic body and glycerine or a glycerine derivative may be employed for any of the purposes for which other phenolic condensation products are now utilized, being especially valuable as a shellac substitute. When in the initial or semi-solid stage it may be employed as a base in the manufacture of varnish and may be used for the impregnation of vulcanized fibre, paper or fabrics in sheet, tube, block or rod form, after which upon the application of suitable heat such as that resulting from 125 pounds steam pressure and a pressure of about one thousand pounds per square inch, for from one to five hours or more, depending upon the dimensions and form of the structure, it may be caused to change to its final or solid form.

In making a laminated structure such as a block, sheet tube, or rod, the above condensation product in its liquid or semi-solid initial stage is dissolved in from fifty to sixty parts of an organic solvent such as alcohol or acetone and is caused to uniformly permeate the sheet or other fibrous or porous body either by directly soaking the latter in said liquid or by any other known method. After the solvent has been removed by heating in an oven or dry house, the impregnated sheets or other structures may be subjected to relatively high pressure such as one thousand pounds to the square inch and to a temperature such as that of steam at one hnudred and twenty-five pounds pressure for a period depending upon the thickness and dimensions of said material. Tubes or rods may be made from the above described impregnated sheet material by winding it on a mandrel of suitable dimensions and thereafter subjecting it to heat and pressure such as above indicated.

In any case the resulting product is unaffected by moisture and by the ordinary organic solvents, it has a high mechanical strength, and is especially adapted for mechanical and electrical purposes, being particularly useful in the manufacture of gears, electrical insulators, phonograph records, etc.

Without departing from our invention we may vary the proportions of the glycerine or glycerine derivative and of the phenolic body employed therewith and we may also vary the temperatures, pressures and time of treatment,—the essential feature of the invention residing in the production of a condensation product constituting a synthetic resin by utilization of a phenolic body and glycerine or derivative thereof as described above. In place of phenol we may employ any of its homologues such as o-, m-, p-cresol, or any compound containing a hydroxyl radical joined to a benzene ring, substituted or not.

While the condensation product in its initial stage is a liquid or semi-liquid soluble in acetone, alcohol, benzol, etc., in its final form it is infusible and insoluble in the above noted and other ordinary organic solvents, being a hard, tough, resinous substance, breaking with a lustrous fracture and having a dense, homogeneous structure.

If it be desired to accelerate the change of the product from its initial to its final stage, a suitable proportion of a hardening agent may be added prior to its subjection to heat and pressure, and as typical of such material we may use hexamethylenetetramine, benzidine-acetone, sodium-acetone-bisulphite, etc., etc. As typical of catalytic agents which may be employed in place of sulphuric acid, we may use bromine, pyridine, sulphur monochloride, aniline hydrochloride, other acids as hydrochloric; bases, as ammonia; acid salts as sodium bisulphate; and other compounds.

Certain catalysts, we find, for certain uses, cause deleterious effects on the materials with which our condensation product is used, and the removal of the catalyst may therefore be desirable. The catalysts may be removed by simply washing out with water or any other suitable solvent in which the resin or condensation product is insoluble. This removal by a purely physical method, is best performed after the first fusible and soluble condensation product is formed, as heat alone without catalytic assistance will cause the condensation to become total and give a hard, infusible, insoluble product.

If the introduction of water or other solvent as mentioned above is not desirable, the catalyst may be removed by chemical means, i. e., introducing some substance, inert in itself towards the materials which the catalyst destroys but reactive with the catalyst, forming a non-reactive or inert substance which in small quantity does not affect the desirable properties of the condensation product.

The chemical removal of the catalyst takes place best after the first fusible and soluble product is formed, as heat alone can carry the condensation to the final stage.

For instance if sulphuric acid is to be removed, we add a powdered barium carbonate in excess. This latter is inert and the barium sulphate formed may act as a filler.

If bromine is to be removed we add an alcoholic solution of ammonia, and the ammonium bromide which is chiefly formed, is inert.

If cresol be employed in place of phenol we employ it in the proportion of 120 parts to 100 parts of glycerine, while if epichlor hydrin is used in place of glycerine we employ it with an equal amount of phenol or in the proportion of 6 parts cresol to 5 parts epichlor hydrin.

When in its initial stage, our condensation product may be dissolved in alcohol, acetone, benzene, etc. and thereafter be mixed with wood flour, asbestos or other organic or inorganic material, after which the solvent may be removed by heat. The resulting mass may be then ground or otherwise reduced to a powder which may be readily given any desired form by subjecting it while in a mold to a pressure of approximately one thousand pounds to the square inch at a temperature equivalent to that of steam at a pressure of one hundred and twenty-five pounds per square inch, for a period of time depending upon the dimensions and form of the object being molded;—the pressure and heat being continued in any case until the condensation product has assumed its final infusible and solid form.

Inasmuch as our invention contemplates the use of glycerine derivatives such as noted above, as well as glycerine itself, it is to be understood that in the claims the term glycerine is intended to broadly cover and include both the chemical substance known as glycerine and also the derivatives thereof.

Attention is called to a division of this case which was filed by James McIntosh, on February 20, 1925, Serial No. 10,688, covering the resin and the process of making the same without the use of a hardening agent.

We claim:—

1. The method which consists in causing a phenolic body, a catalyst and glycerine to react to form an initial condensation product and thereafter subjecting said initial product to further condensation in the presence of a hardening agent to cause it to assume a solid, infusible form.

2. The method which consists in causing a phenolic body and glycerine to react to form an initial condensation product and thereafter subjecting said initial product to further condensation in the presence of a hardening agent to cause it to assume a solid infusible form.

3. A process comprising heating a glycerine-phenol condensation product with a formaldehyde material sufficiently to harden the same and form an infusible, insoluble product.

4. A process which comprises heating a glycerine-phenol condensation product which is solid at room temperature with a formaldehyde material sufficiently to harden the same and form an infusible, insoluble product.

5. A hard, infusible product being a reaction product of a glycerine-phenol fusible condensation product which is solid at room temperature, with a formaldehyde material.

6. A hard, infusible product being a reaction product of a glycerine-phenol fusible condensation product, with a formaldehyde derivative.

7. A hard, infusible product obtained by the further reacting of a glycerine-phenol condensation product, with a hardening agent.

8. As a new composition of matter, a potentially reactive condensation product of a phenol and a polyhydric alcohol and a hardening agent therefor, said product being convertible by heat and pressure into a hard, infusible body.

9. As a new composition of matter, a potentially reactive condensation product of a phenol and polyhydric alcohol and a methylene-containing accelerating agent therefor, said product being convertible by heat into a hard, infusible body.

10. As a new composition of matter, a potentially reactive condensation product of a phenol and a glycerol and a hardening agent therefor, said product being convertible by heat into a hard, infusible body.

11. As a new composition of matter, a potentially reactive condensation product of a phenol and a glycerol and a methylene-containing hardening agent therefor, said product being convertible by heat into a hard, infusible body.

12. The herein described method which comprises producing a condensation product of a phenolic body and a polyhydric alcohol, and then adding an accelerating agent thereto.

13. The herein described method which comprises reacting a phenol and a glycerol to obtain an initial condensation product, and then adding a methylene-containing accelerating agent thereto.

JAMES McINTOSH.
EDWIN YEAKLE WOLFORD.